US007924141B2

(12) United States Patent
Tuttle (10) Patent No.: US 7,924,141 B2
(45) Date of Patent: Apr. 12, 2011

(54) RFID COMMUNICATION SYSTEMS AND METHODS, AND RFID READERS AND SYSTEMS

(75) Inventor: John R. Tuttle, Boulder, CO (US)

(73) Assignee: Round Rock Research, LLC, Mt. Kisco, NY (US)

( * ) Notice: Subject to any disclaimer, the term of this patent is extended or adjusted under 35 U.S.C. 154(b) by 1164 days.

(21) Appl. No.: 11/607,263

(22) Filed: Dec. 1, 2006

(65) Prior Publication Data

US 2008/0129485 A1    Jun. 5, 2008

(51) Int. Cl.
*H04Q 5/22* (2006.01)
(52) U.S. Cl. .................. 340/10.1; 340/572.4; 340/5.92; 340/5.74
(58) Field of Classification Search .............. 340/10.1, 340/568.1, 572.4, 825.72; 235/385
See application file for complete search history.

(56) References Cited

U.S. PATENT DOCUMENTS

| | | | |
|---|---|---|---|
| 5,365,551 A | 11/1994 | Snodgrass et al. | 375/141 |
| 5,500,650 A | 3/1996 | Snodgrass et al. | 342/42 |
| 5,583,850 A | 12/1996 | Snodgrass et al. | 370/342 |
| 5,627,544 A | 5/1997 | Snodgrass et al. | 342/42 |
| 6,061,344 A | 5/2000 | Wood, Jr. | 370/346 |
| 6,072,801 A | 6/2000 | Wood, Jr. et al. | 370/437 |
| 6,118,789 A | 9/2000 | Wood, Jr. | 370/462 |
| 6,275,476 B1 | 8/2001 | Wood, Jr. | 370/312 |
| 6,384,712 B1 * | 5/2002 | Goldman et al. | 340/10.3 |
| 6,566,997 B1 | 5/2003 | Bradin | 340/10.2 |
| 6,707,376 B1 | 3/2004 | Patterson et al. | 340/10.3 |
| 7,026,935 B2 | 4/2006 | Diorio et al. | 340/572.2 |
| 7,030,761 B2 * | 4/2006 | Bridgelall et al. | 340/572.2 |
| 7,040,532 B1 * | 5/2006 | Taylor et al. | 235/375 |
| 7,683,760 B2 * | 3/2010 | Ehrman et al. | 340/10.1 |
| 2005/0263591 A1 * | 12/2005 | Smith | 235/385 |
| 2006/0022800 A1 | 2/2006 | Krishna et al. | 340/10.2 |
| 2006/0022801 A1 | 2/2006 | Husak et al. | 340/10.5 |
| 2006/0022815 A1 | 2/2006 | Fischer et al. | 240/505 |
| 2006/0170565 A1 | 8/2006 | Husak et al. | |
| 2006/0175407 A1 | 8/2006 | Kinoshita | |

FOREIGN PATENT DOCUMENTS

| WO | 2004036482 A | 4/2004 |
|---|---|---|
| WO | 2008069891 | 6/2008 |

OTHER PUBLICATIONS

EPC™ Radio Frequency identity Protocols Class-1 Generation-2 UHF RFID Protocol for Communications at 860 MHz—960Mhz, *EPC global* Version 1.0.9, Cover Sheet and pp. 37-38 (Jan. 2005).
Wright, Jim, et al. "Trends and Innovations in RF Identification", *SUN Microsystems*, (presentation); 30 pp. (undated).
Whitepaper, "Understanding Gen 2: What It Is, How You Will Benefit and Criteria for Vendor Assessement", *Symbol Technologies, Inc.*, 8 pp. (Jan. 2006).
PCT/US07/23661—Internatinal Search Report (mailed Jun. 10, 2008).
PCT/US07/23661—Written Opinion (mailed Jun. 10, 2008).

* cited by examiner

*Primary Examiner* — Vernal U Brown
(74) *Attorney, Agent, or Firm* — Lerner, David, Littenberg, Krumholz & Mentlik, LLP (57) ABSTRACT

A method of coordinating a plurality of RFID readers includes controlling the RFID readers such that only one of the readers performs an inventory of RFID tags at a time. A system for coordinating a plurality of RFID readers is also provided.

18 Claims, 9 Drawing Sheets

FIG. 1

| CONTROLLER SEQUENCE | READER 1 | READER 2 | DB 1 | DB 2 | LOCKOUT BIT STATUS ||| 
|---|---|---|---|---|---|---|---|
| | | | | | TAG 1 | TAG 2 | TAG 3 |
| 210 | OFF | OFF | EMPTY | EMPTY | 0 | 0 | 0 |
| 211 | ON | | | | | | |
| 212 | | | TAG 1 | | 1 | 0 | 0 |
| 213 | | | TAG 1<br>TAG 2 | | 1 | 1 | 0 |
| 214 | | | | | | | |
| 215 | | | TAG 1<br>TAG 2 | | 0 | 0 | 0 |
| 216 | OFF | | TAG 1<br>TAG 2 | | 0 | 0 | 0 |
| 217 | | ON | TAG 1<br>TAG 2 | | 0 | 0 | 0 |
| 218 | | | TAG 1<br>TAG 2 | TAG 3 | 0 | 0 | 1 |
| 219 | | | | | | | |
| 220 | | | TAG 1<br>TAG 2 | TAG 3 | 0 | 0 | 0 |
| 221 | | OFF | | | | | |
| 222 | ON | | | | | | |
| 223 | | | TAG 1<br>TAG 2 | TAG 3 | 1 | 1 | 0 |
| 224 | | | TAG 1<br>TAG 2<br>TAG 3 | TAG 3 | 1 | 1 | 1 |
| 225 | | | | | 1 | 1 | 1 |
| 226 | | | TAG 1<br>TAG 2<br>TAG 3 | TAG 3 | 0 | 0 | 0 |
| 227 | | | | | 0 | 0 | 0 |
| 228 | OFF | | | | | | |
| 229 | | | | | 0 | 0 | 0 |
| 230 | | ON | | | | | |
| 231 | | | TAG 1<br>TAG 2<br>TAG 3 | TAG 3 | 0 | 0 | 1 |
| 232 | | | TAG 1<br>TAG 2<br>TAG 3 | TAG 3<br>TAG 2 | 0 | 1 | 1 |
| 233 | | | TAG 1<br>TAG 2<br>TAG 3 | TAG 3<br>TAG 2<br>TAG 1 | 1 | 1 | 1 |
| 234 | | | TAG 1<br>TAG 2<br>TAG 3 | TAG 3<br>TAG 2<br>TAG 1 | | | |
| 235 | OFF | OFF | | | | | |

| CONTROLLER SEQUENCE | READER 1 | READER 2 | DB 1 | DB 2 | LOCKOUT BIT STATUS | | |
|---|---|---|---|---|---|---|---|
| | | | | | TAG 1 | TAG 2 | TAG 3 |
| | TAG 3 IS MISSING ⟹ | | TAG 1<br>TAG 2 | TAG 3<br>TAG 2<br>TAG 1 | | | |

FIG. 8

| CONTROLLER SEQUENCE | READER 1 | READER 2 | DB 1 | DB 2 | LOCKOUT BIT STATUS | | |
|---|---|---|---|---|---|---|---|
| | | | | | TAG 1 | TAG 2 | TAG 3 |
| | TAG 4 IS NEW ⟹ | | TAG 1<br>TAG 2<br>TAG 3 | TAG 3<br>TAG 2<br>TAG 1<br>TAG 4 | | | |

RFID COMMUNICATION SYSTEMS AND METHODS, AND RFID READERS AND SYSTEMS

TECHNICAL FIELD

The technical field relates to radio frequency identification. More particularly, various embodiments of the invention relate to methods and apparatus for avoiding collisions between readers of radio frequency identification devices.

BACKGROUND

Radio frequency identification devices (RFIDs) are known in the art. Such devices are typically used for inventory tracking. As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. One way to track objects is by affixing RFID tags to objects or groups of objects, and interrogating the RFID tags with an interrogator or reader to determine which objects are present in any particular location. RFID tags may be provided with unique identification numbers or codes in order to allow a reader to distinguish between multiple different tags.

Some RFID tags use the electromagnetic field from an interrogator for power. Typically, these devices are passive (have no power supply), which results in a small and portable package.

Another type of RFID tag is an active RFID tag, which includes its own source of power, such as a battery.

If an interrogator or reader has prior knowledge of the identification number of a device, the reader can specify that a response is requested only from the device with that identification number. Sometimes, such information is not available. For example, there are occasions where a reader is attempting to determine which of multiple devices are within communication range. When the reader sends a message to a transponder device requesting a reply, there is a possibility that multiple transponder devices will attempt to respond simultaneously, causing a collision, and thus an erroneous message to be received by the reader. For example, if the interrogator sends out a command requesting that all devices within a communications range identify themselves, and receives a large number of simultaneous replies, the interrogator may not able to interpret any of these replies. Therefore, arbitration or singulation schemes are employed to permit communications that are free of collisions. The term singulation refers to identifying a specific individual tag in a multiple tag environment.

In some arbitration or singulation schemes, described in commonly assigned U.S. Pat. Nos. 5,627,544; 5,583,850; 5,500,650; and 5,365,551, all to Snodgrass et al. and the disclosures of all of which are incorporated herein by reference, a reader sends a command causing each device of a potentially large number of responding devices to select a random number from a known range and use it as that device's arbitration number. By transmitting requests for identification to various subsets of the full range of arbitration numbers, and checking for an error-free response, the interrogator quickly determines the arbitration number of every responder station capable of communicating at the same time. Thereafter, the interrogator is able to conduct subsequent uninterrupted communication with devices, one at a time, by addressing only one device. Various arbitration or singulation schemes are discussed in commonly assigned U.S. Pat. No. 6,275,476 to Wood, Jr.; U.S. Pat. No. 6,118,789 to Wood, Jr.; U.S. Pat. No. 6,072,801 to Wood, Jr. et al.; and U.S. Pat. No. 6,061,344 to Wood, Jr., the disclosures of all of which are incorporated herein by reference.

It is possible to have multiple readers operating in the same location. Problems can arise when multiple readers try to read the same tag at the same time. To speed up the identification process for a large number of tags, each tag has some internal method of removing itself from the inventory, after it has been identified by a reader. If a second reader wants to inventory the same population (or even read a single tag) during a first reader's inventory session, then the possibility exists that the second reader will not read some of the tags. This is because the tags that have been identified by the first reader have discontinued responding to any reader during the inventory as it has been flagged to remove itself from inventory.

Just as two (or more) tags responding to one reader can create an unreadable-information collision at the reader, two (or more) readers broadcasting to one tag can create an unreadable-information collision at the tag, along with possible RF interference.

EPCglobal is a standard setting organization that is developing standards for electronic product codes to support the use of RFID technology. One of their standards, called Class 1, Generation 2 (also known as "Gen 2") applies to passive RFID systems, and is described on their websites at www.epcglobalus.org or www.epcglobalinc.org. These standards evolve over time, and for a particular standard, such as Gen 2, there are minor variations between versions. The present version of the Class 1, Generation 2 standard is version 1.0.9.

The EPCglobal Class 1, Generation 2 standard has implemented a method called "Sessions" to attempt to solve the problem of two, three or four readers reading the same population of tags in the same time period; i.e., an inventory processes overlap.

According to the specification, a reader shall support and tags shall provide four sessions, and tags shall participate in one and only one session during an inventory round. Two or more interrogators can use sessions to independently inventory a common tag population. Tags associate a separate and independent "inventoried" flag to each of several readers. After singulating a tag, an interrogator may issue a command that causes the tag to invert its inventoried flag for that session.

However, the inventory Sessions concept, as it is described in the EPCglobal Class 1, Generation 2 specification, has at least one important shortcoming. One tag receiving power from two or more readers at the same moment will be prevented from recognizing the command from either reader. Although, in some cases, the multiple readers will each try again, there is no guarantee that they will be successful, since they are both continuing to retry. Further, either reader may decide that there is no tag present, and will therefore miss a tag or tags.

Even though the EPCglobal Class 1, Generation 2 specification states that the inventory process is "time-interleaved," that is not necessarily the case because of the time independence of each interrogator. One reader's broadcast may step on or interfere with another reader's broadcast, causing indeterminate results. Tags faced with trying to read both readers will not be able to interpret the mingled transmissions, and may not respond at all, without regard to which session the readers want. There is no required time coordination between the two readers in the sessions concept of EPCglobal Class 1, Generation 2.

If two or more readers are performing an inventory, this can and often will lead to indeterminacy in the inventory process, either in reading all the tags if the inventory process is stopped too soon, or in the length of time it takes to get a high probability that all readers have read all the tags within their ranges. Users expect not just a high probability, but a 100% probability that all readers have read all the tags. The EPCglobal inventory process has so many rapid queries that the probability that another reader (in any of the other three sessions) can cause reader interference at a tag is extremely high. The queries are rapid in order to achieve a 1000 tags/second inventory rate stated in the specification. Reader interference includes multiple overlapping reader broadcasts. The interference can be at different tags at different times.

Because the EPCglobal Sessions concept allows for four sessions, the problem is magnified further if three and four readers are broadcasting simultaneously. Also, the persistence times add to the indeterminacy (and therefore, unreliability) of the multiple inventory sessions process.

The reader collision problem is exacerbated by the fact that each tag being inventoried must sometimes establish communications not once, but twice or more with a given reader (and session). More particularly, the EPCglobal specification recites that " . . . After singulating a Tag an Interrogator may issue a [second] command that causes the Tag to invert its inventoried flag for that session . . . ". Notice that a tag must first be singulated, which can be problematic.

BRIEF DESCRIPTION OF THE DRAWINGS

FIG. 7 is a portion of a table illustrating an example of implementation of the embodiment of FIG. 5.

DETAILED DESCRIPTION OF THE ILLUSTRATED EMBODIMENTS

Various embodiments of the invention provide a method of coordinating a plurality of RFID readers, including controlling the RFID readers such that one and only one of the readers performs an inventory of RFID tags at a time.

Various embodiments provide solutions to this problem with the EPCglobal Class 1, Generation 2 specification. Various embodiments provide a solution to the problem of collisions between readers regardless of what specification or standard is used.

Figure 1:
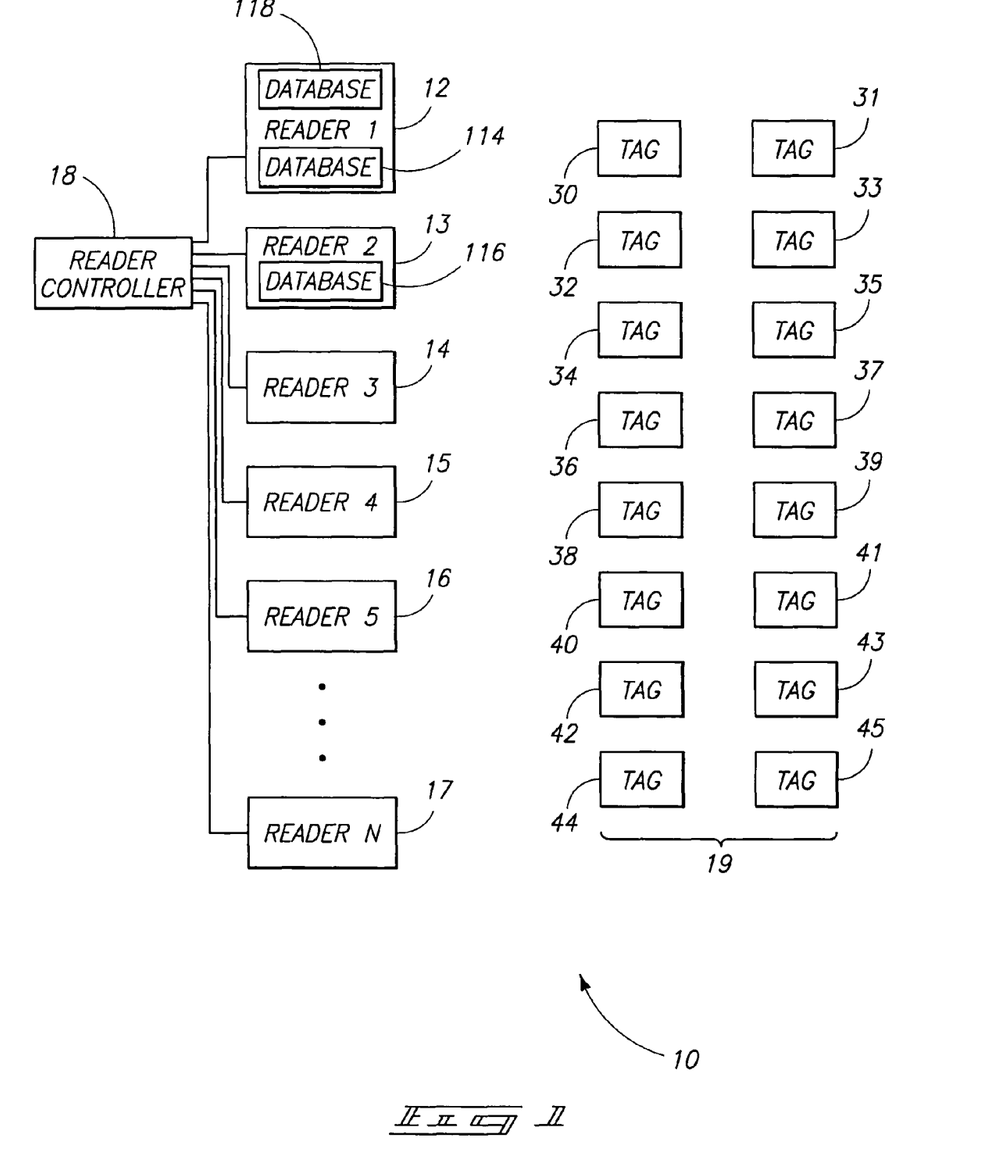
FIG. 1 is a block diagram of a system according to various embodiments of the present disclosure.

FIG. 1 shows a system 10 including a plurality of RFID readers 12-17. The readers 12-17 include some handheld readers 12-14 and some fixed readers 15-17. The system 10 further includes a population 19 of RFID tags 30-45. Any of the RFID readers 12-17 can communicate with any of the RFID tags 30-45. In the embodiment of FIG. 1, only one reader broadcasts at a time or per period of time. In some embodiments, the tags and readers otherwise follow the Class 1, Generation 2 specification. In these embodiments, the inventory sessions concept will work more reliably. This embodiment allows any number N of readers to inventory a population 19 of tags, instead of just two. The benefits of this embodiment are increased reliability and/or increased speed.

The reader controller 18 coordinates multiple readers 12-17. In some embodiments, the reader controller 18 only allows one reader to broadcast at any given instant or period of time, whether or not different readers are inventorying using different sessions. This is referred to as reader multiplexing.

Figure 2:
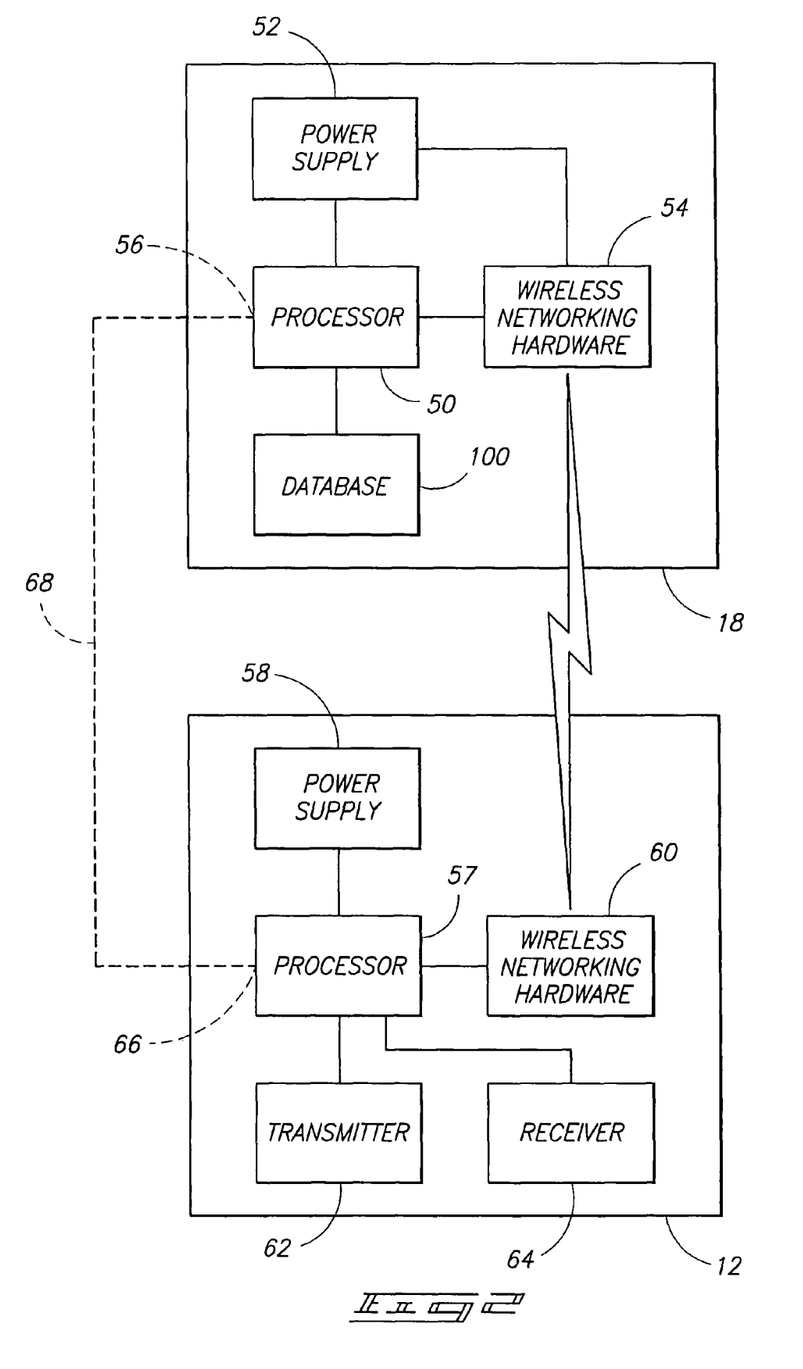
FIG. 2 is a block diagram of the reader controller and of a reader included in the system of FIG. 1 in one embodiment. Other embodiments are also contemplated.

FIG. 2 is a block diagram illustrating additional construction details of the reader controller 18 and of a reader 12. The reader controller 18 includes a processor 50, a power supply 52, wireless networking hardware 54, and a wired output 56. The wireless networking hardware 54 can comprise Wi-Fi (e.g., IEEE 802.11 or 802.20) circuitry, in some embodiments. At least one of the readers, for example, reader 12, includes a processor 57, a power supply 58, wireless networking hardware 60, a transmitter 62, a receiver 64, and may include a wired input 66. The wireless networking hardware 60 can comprise Wi-Fi circuitry, in some embodiments. The reader 12 is controlled by the controller 18 via the wireless networking hardware 60 and 54. In some embodiments, the reader 12 is also capable of being coupled to the controller 18 by a wire or cable 68, though it includes the wireless networking hardware 60. In some embodiments, the reader 12 is controlled by the controller 18 via the wire or cable 68, and the wireless networking hardware is omitted. The reader 12 communicates with tags 30-45 using the transmitter 62 and the receiver 64.

Both fixed and handheld (mobile) readers may be equipped with the wireless network hardware. The multiplexing periods can be constructed so as to be transparent to the user.

In some embodiments, any number of readers may be coordinated at the system level of control, by the controller 18, such that each reader must finish its inventory before the next reader is allowed to broadcast commands to perform its inventory function. This allows for more than four sessions. Any desired number, N, of readers can be employed.

Figure 3:
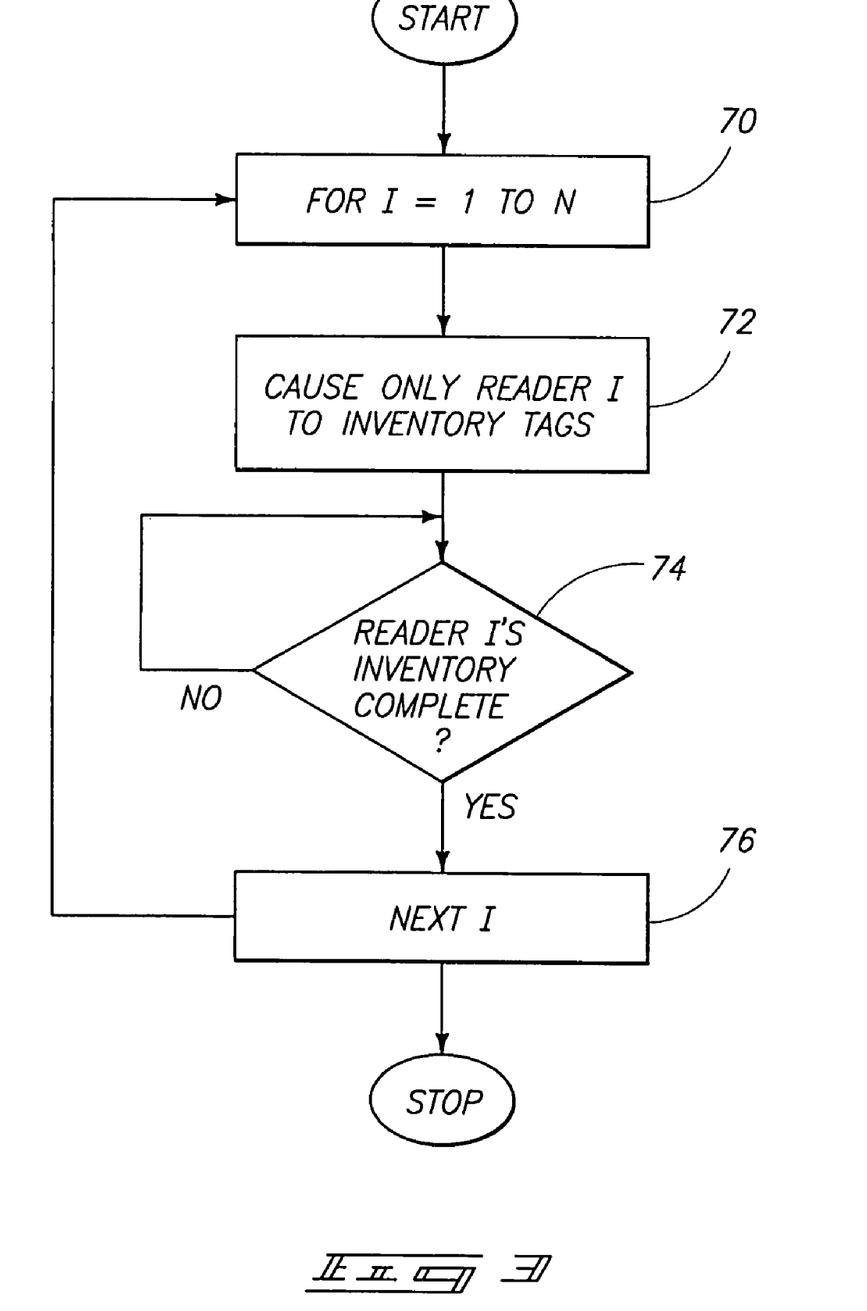
FIG. 3 is a flowchart illustrating a process executed by the reader controller of FIG. 2, in one embodiment. Other embodiments are also contemplated.

For example, FIG. 3 is a flowchart illustrating a process executed by the processor 50 of reader controller 18, in some embodiments. In step 70, a loop is started. The loop is repeated for values of I equaling 1 to N, starting with I=1, and I is incremented each time the loop repeats.

In step 72, the reader controller 18 enables only reader I to inventory tags. In other words, one and only one reader is caused to inventory tags.

In step 74, a determination is made as to whether or not reader I has completed its inventorying of tags. If not, the inventorying continues. If reader I has completed its inventorying of tags, the processor 50 proceeds to step 76, the loop increments, and the next reader is caused to inventory tags.

In other embodiments of the invention, the reader controller 18 is configured to determine whether or not to use the reader multiplexing by first comparing tag unique identification numbers or serial numbers read by each reader. In some embodiments, the reader controller 18 may include a database 100 storing numbers of tags read by each reader, and database manager software that looks for situations where two readers are attempting to read the same population of tags. If any tag serial numbers were read by multiple readers, that means that the two readers are working on the same tag population. Such readers are multiplexed (e.g., FIG. 3 is followed for readers working on the same tag population). The inventory(ies) may be restarted for these readers, but in a multiplexed manner.

Figure 4:
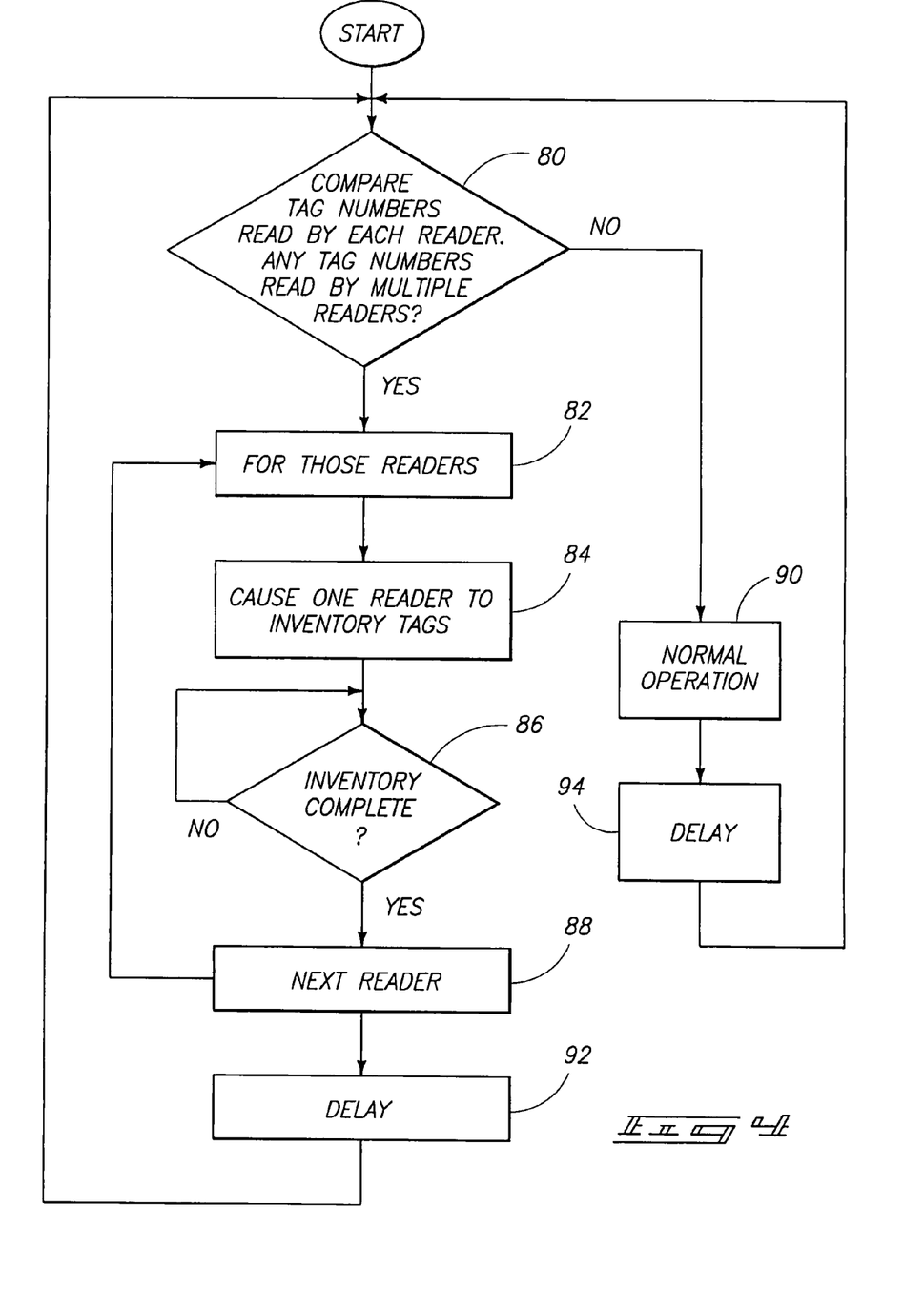
FIG. 4 is a flowchart illustrating a process executed by a reader controller, in one embodiment. Other embodiments are also contemplated.

For example, FIG. 4 is a flowchart illustrating a process executed by the processor 50 of reader controller 18, in some embodiments. In step 80, tag numbers read by each reader are compared and a determination is made whether any tag numbers were read by multiple readers. If so, the processor 50 proceeds to step 82. If not, the processor 50 proceeds to step 90.

In step 82, a loop is started. The loop is repeated for each of those readers identified in step 80 as having read tag numbers read by another reader.

In step 84, the reader controller 18 enables only one of those readers to inventory tags. In other words, one and only one reader is caused to inventory tags. The inventorying is restarted if the reader already performed an inventory.

In step 86, a determination is made as to whether or not reader that is inventorying has completed its inventorying of tags. If not, the inventorying continues. If the reader has completed its inventorying of tags, the processor 50 proceeds to step 88, the loop increments, and the next reader is caused to inventory tags.

In step 90, normal operation continues without multiplexing.

This embodiment handles, for example, the situation where a handheld (mobile) reader comes into the same working volume or area as a fixed reader or another handheld, where both readers need to determine accurate tag inventories.

In some embodiments, when the multiple readers are not reading any of the same tag serial numbers any more (e.g., if a reader has moved out of the area), the multiplexing of readers can be terminated. Thus, in some embodiments, after a delay 92 or 94, the comparison 80 is performed again.

In other embodiments, all the multiple readers 12-17 in the system may be multiplexed all the time.

In some embodiments, a database is used to keep track of tag serial numbers (or any form of tag IDs) that are locked out for each reader while it performs inventory. This allows an inventory by any reader to be interrupted and later resumed where it left off.

Figure 5:
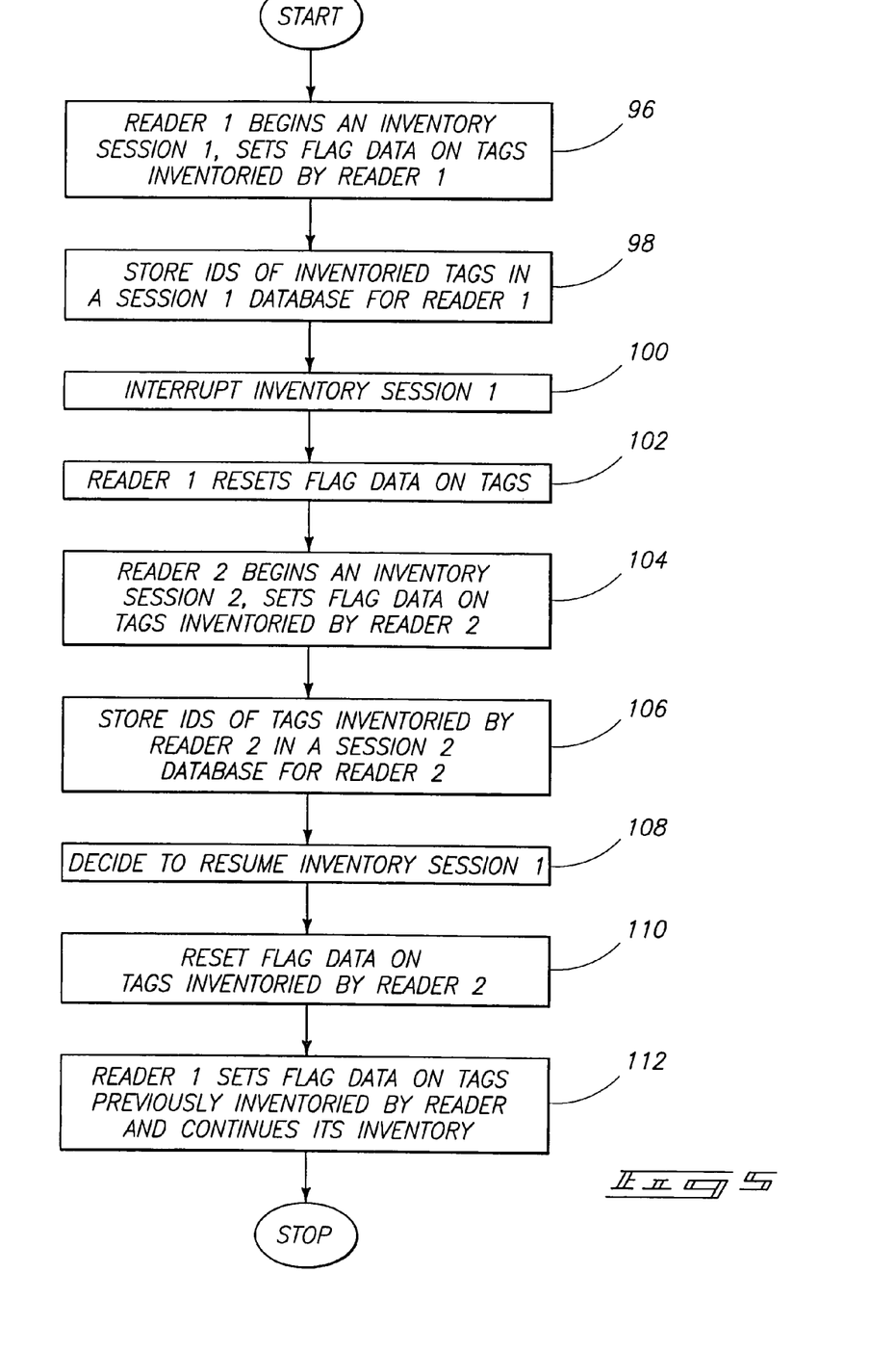
FIG. 5 is a flowchart illustrating a process executed by multiple readers where an inventory session is interrupted and continued later, in some embodiments. Other embodiments are also contemplated.

FIG. 5 is a flowchart illustrating a process executed by multiple readers 12-17, in some embodiments, to perform any number N of sessions by any number M of readers wherein one or more sessions are interrupted during a reader's inventory. The process of FIG. 5 allows the session to be resumed later without the reader missing inventorying any tags.

In step 96, under the control of the controller 18, one reader 12-17 (referred to in FIG. 5 as Reader 1) begins an inventory session (referred to in FIG. 5 as Session 1). An inventory session of step 96 can include, for example, an inventorying session as described in the EPCglobal Class 1, Generation 2 specification. In some embodiments, the inventory session of step 96 can include an arbitration process as described in the above-mentioned Snodgrass patents. In the illustrated embodiment, Reader 1 sets a flag (or stores data) on tags that are identified or inventoried by Reader 1 (e.g., inventoried, identified, or singulated without collision). The flag indicates that the tag has been inventoried. In some embodiments, the flag is a lockout bit as described in the above mentioned Snodgrass patents. In other embodiments, the flag is a session bit as described in the EPCglobal Class 1, Generation 2 specification.

In step 98, identification information (e.g., tag IDs, portions of tag IDs, or other data identifying tags) for inventoried tags is stored. In some embodiments, the identification information for inventoried tags is stored in a database 114 for Reader 1. This database 114 is stored, in some embodiments, in Reader 1 itself (see FIG. 1).

If the reader controller 18 decides to let another of the readers 12-17, referred to in FIG. 5 as Reader 2, begin an inventory process, Reader 1's inventory session is interrupted in step 100. Reader 1's inventory session is referred to as Session 1 in FIG. 5. The reader controller 18 may decide to interrupt Reader 1's inventory process for any of a variety of reasons. For example, Reader 2 may be considered to be more important or higher priority than Reader 1.

In step 102, Reader 1 resets flags or data. In some embodiments, all the flags or data (e.g., lockout bits) are cleared or reset for the entire tag population. In some embodiments, the flags that were set in step 96 are cleared or reset.

In step 104, Reader 2 begins its inventory session freshly. Reader 2 sets a flag (or stores data) on tags that are identified or inventoried by Reader 2 (e.g., inventoried, identified, or singulated without collision).

In step 106, identification information (e.g., tag IDs, portions of tag IDs, or other data identifying tags) for inventoried tags is stored. In some embodiments, the identification information for inventoried tags is stored in a database 116 for Reader 2. This database 116 is stored, in some embodiments, in Reader 2 itself (see FIG. 1).

In step 108, the controller 18 decides that it is time for Reader 1 (or any other reader M) to resume its inventory. This can include interrupting Reader 2's Session 2. In some embodiments, the Session 2 flagged tag data is stored in a database 118 in Reader 1, or somewhere else. The database 118 includes data representing Reader 2's inventory thus far.

In step 110, all the flags are reset. The resetting is performed by Reader 2 in some embodiments, and by Reader 1 in other embodiments.

In step 112, Reader 1 uses the tag identification information in its Session 1 database 114 to re-flag the tags that were previously identified as locked-out in Session 1, and Reader 1 continues its sort from where it left off.

Other readers can similarly be interrupted and later continue their inventory sessions. Because the readers can communicate with each other as well as with the reader controller, the various databases can be stored wherever desired.

Figure 6:
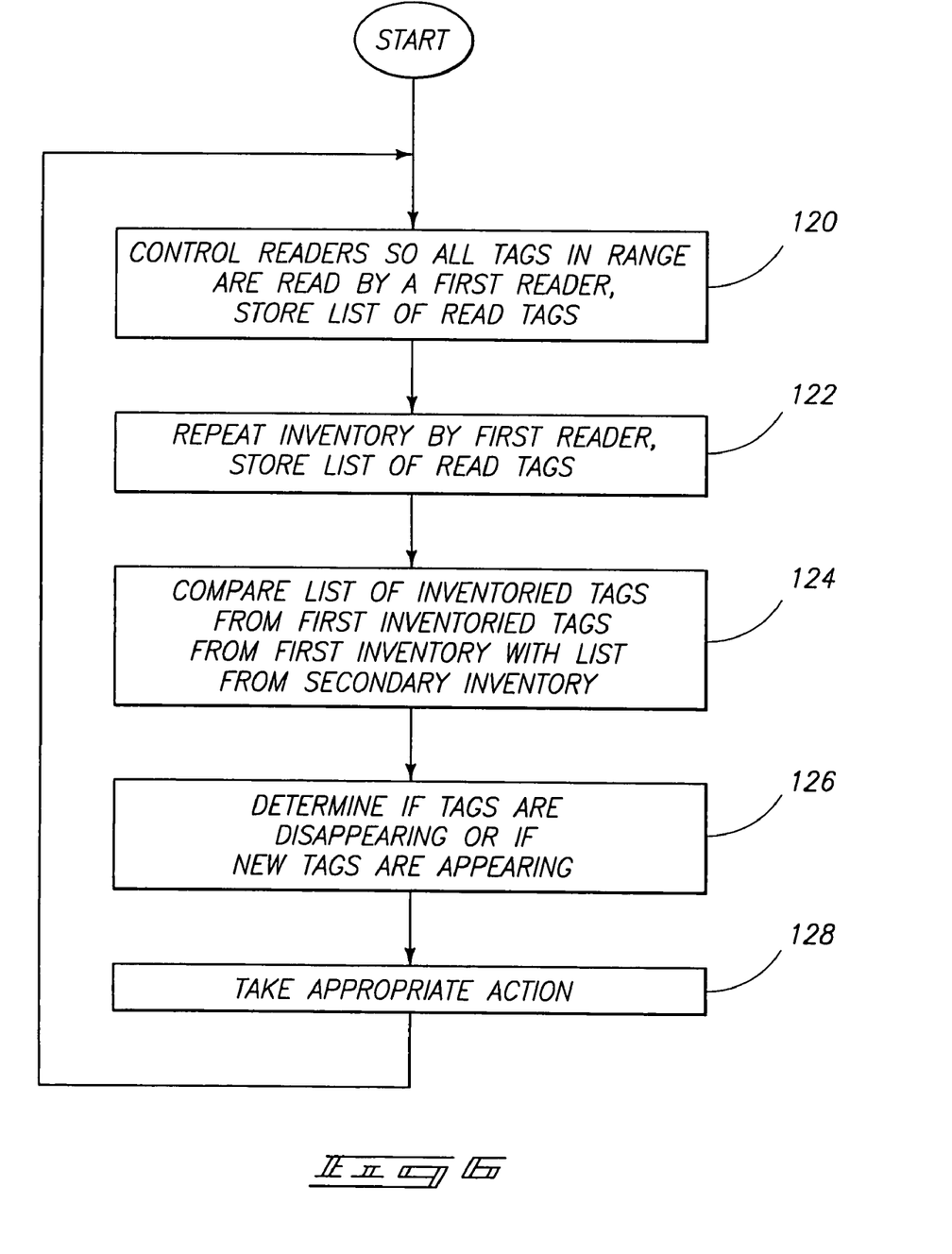
FIG. 6 is a flowchart illustrating a process executed by multiple readers to determine if tags are appearing or disappearing. Other embodiments are possible.

FIG. 6 is a flowchart illustrating a process for addressing the problem of tag populations that change during an inventory session.

In step 120, the readers 12-17 are controlled so that all tags in range are read or inventoried by a first reader. Reader multiplexing, as described above, is performed so that collisions and interference do not perturb the inventory results. This increases the likelihood that all tags in range are read by a first reader. More particularly, in some embodiments, the readers are controlled so that one and only one reader at a time performs an inventory. A list of identification information (e.g., tag IDs, portions of tag IDs, or other data identifying tags) for inventoried tags is stored; e.g., in the first reader.

In step 122, the inventorying of step 120 is repeated (e.g., by the first reader).

In step 124, the list of inventoried tags (e.g., tag IDs, portions of tag IDs, or other data identifying tags) from the inventorying of step 120 by the first reader is compared with the list of inventoried tags from the inventorying of step 122.

In step 126, the comparison of step 124 is used to determine if original tags are disappearing or if new tags are appearing.

In step 128, appropriate action is taken depending on whether original tags are disappearing or new tags are appearing. A variety of different actions can be taken. This method reveals whether the inventory is changing and how it is changing. It may be used in conjunction with the multiplexing methods described in the preceding Figures. In the illustrated embodiment, the steps of FIG. 6 are repeated, and a list of tags for each inventory session is kept.

Particular examples will now be provided to better enable one of ordinary skill in the art to understand the embodiments of FIGS. 5 and 6. These are examples only; other situations are, of course, possible.

Figure 10:
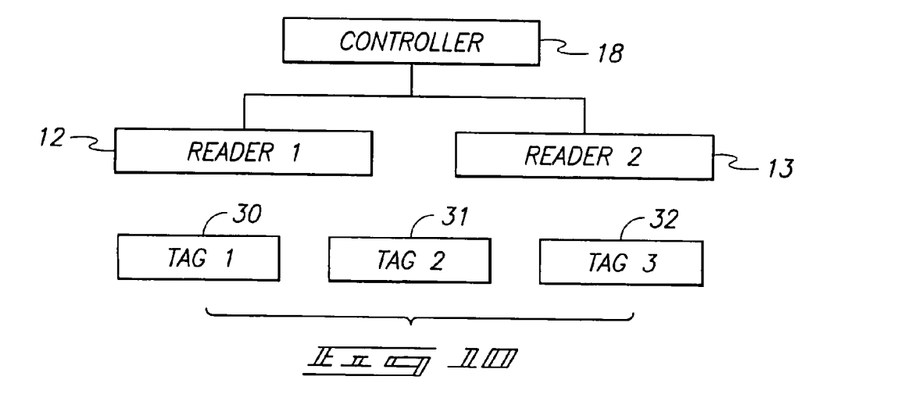
FIG. 10 is a block diagram illustrating a system described in connection with the example of FIG. 7.

FIG. 7 illustrates an example of implementation of the embodiment of FIG. 5. As a simplification, only three tags and two readers are illustrated. In an actual implementation, there would likely be a much larger population of tags and more readers. In this example, all tags are in view of all readers, as shown in FIG. 10.

At time 210, an inventory sequence is started. All tags have lockout bits equal to zero, and both readers illustrated in the example are off.

At time 211, the controller 18 turns on Reader 1 only.

At time 212, Reader 1 finds and locks out Tag 1.

At time 213, Reader 1 finds and locks out Tag 2

At time 214, it is time for whatever reason to switch to Reader 2.

At time 215, the controller 18 tells Reader 1 to reset all its locked out tags in Database 1 (corresponding to database 114 in FIG. 1). Note that all tags have lockout bits equal to zero.

At time 216, Reader 1 is turned off.

At time 217, only Reader 2 is turned on.

At time 218, Reader 2 finds and locks out Tag 3.

At time 219, it is time, for whatever reason, to switch back to Reader 1.

At time 220, Reader 2 resets all its locked out tags in Database 2. Note that now all tags have lockout bits equal to zero.

At time 221, Reader 2 is turned off.

At time 222, Reader 1 is turned on.

At time 223, from Database 1, Reader 1 sets lockout bits on Tag 1 and Tag 2.

At time 224, Reader 1 finds and locks out Tag 3.

At time 225, Reader 1 cannot find any more tags.

At time 226, the controller 18 tells Reader 1 to reset all tag lockout bits to zero.

At time 227, the inventory session for Reader 1 is finished.

At time 228, the controller 18 turns off Reader 1.

At time 229, the controller 18 decides to resume the inventory for Reader 2.

At time 230, the controller 18 turns on Reader 2.

At time 231, Reader 2 sets tag lockouts per its database; i.e., Tag 3.

At time 232, Reader 2 finds Tag 2 and sets Tag 2's lockout bit.

At time 233, Reader 2 finds Tag 1 and sets its lockout bit.

At time 234, Reader 2 cannot find any more tags. Inventories are complete.

At time 235, the controller turns off both readers.

Figure 8:
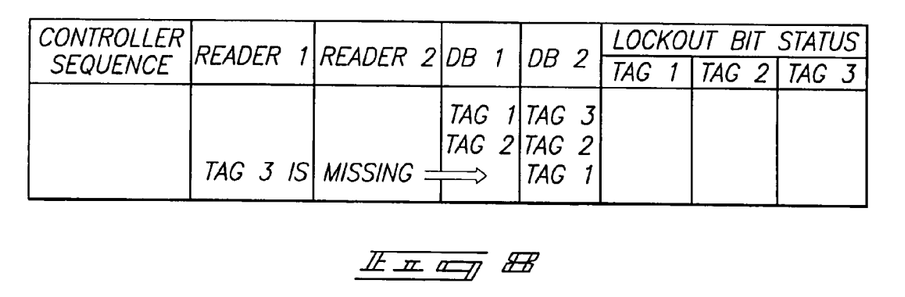
FIG. 8 is a portion of a table illustrating an example of implementation of the embodiment of FIG. 6.
Figure 11:
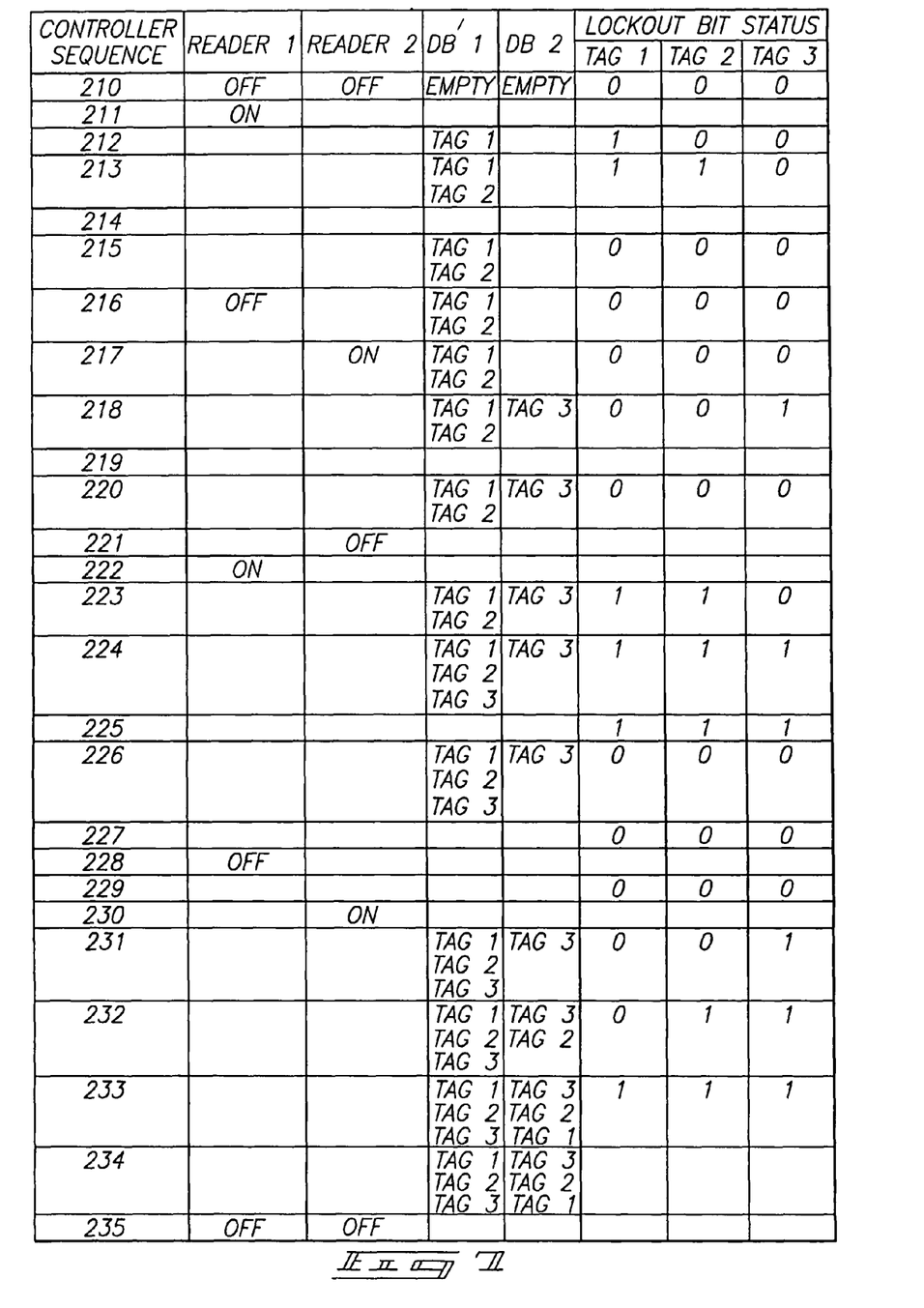
FIG. 11 is a block diagram illustrating a system described in connection with the example of FIG. 8.

FIG. 8 is a portion of a table illustrating an example of implementation of the embodiment of FIG. 6. In this example, Tag 3 leaves the field of Reader 1 as shown in FIG. 11. Repeating the inventory process shown in FIG. 7 produces the inventories shown in FIG. 8. The controller 18 compares the first and second inventory and finds that Tag 3 is no longer in the field of Reader 1 but is still in the field of Reader 2.

Figure 9:
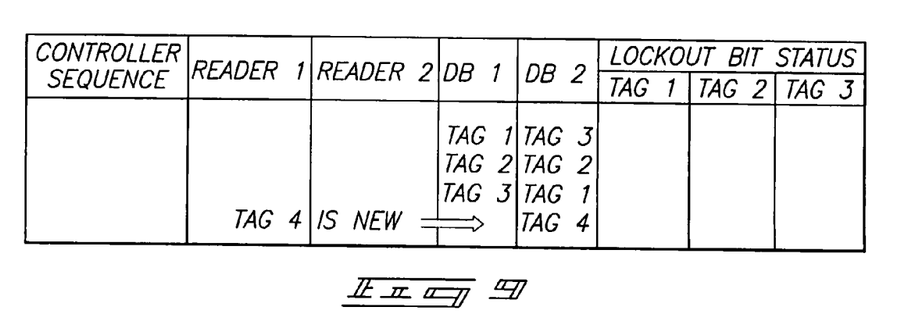
FIG. 9 is a portion of a table illustrating an example of implementation of the embodiment of FIG. 6.
Figure 12:
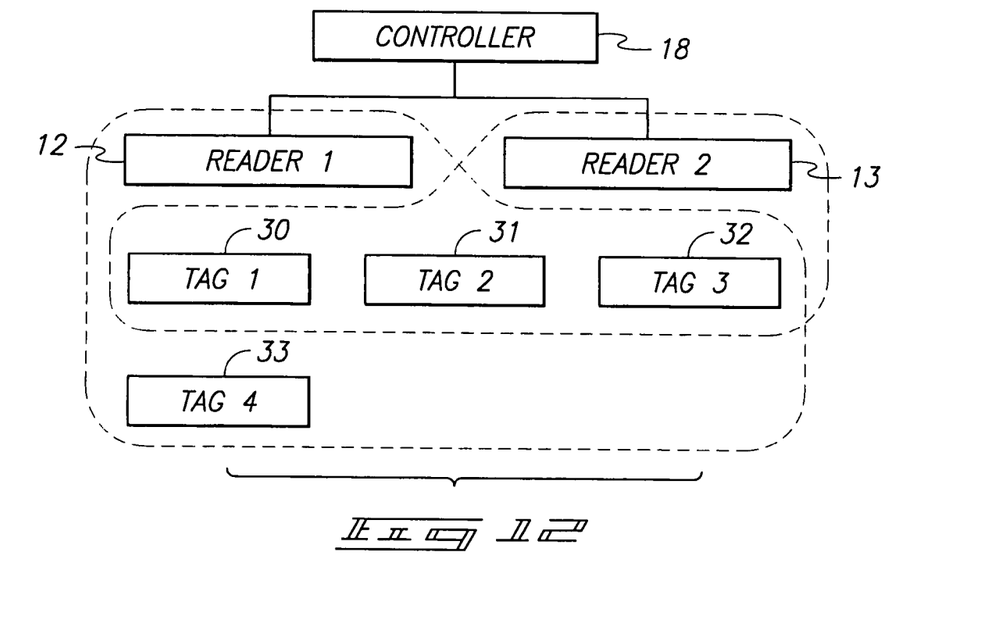
FIG. 12 is a block diagram illustrating a system described in connection with the example of FIG. 9.

FIG. 9 is a portion of a table illustrating an example of implementation of the embodiment of FIG. 6. In this example, Tag 4 enters the field of only Reader 1 as shown in FIG. 12. Repeating the inventory process shown in FIG. 7 produces the inventories shown in FIG. 9. The controller 18 compares the first and second inventory and finds that Tag 4 has entered the field of Reader 2 but is not in the field of Reader 1.

In some embodiments, if, for any reason, a first reader 12-17 (see FIG. 1) is deselected or turned off, a second reader 12-17 may be activated only if no significant reader energy is detected in the vicinity of the second reader. For example, the controller causes the second reader to determine if it is able to detect RF from a reader and, if not, the controller activates the second reader. If there is RF present, a different reader can be selected where reader RF is not present. Detecting RF from a reader may comprise determining if an RF above a certain predetermined threshold, of the type expected from a reader, is present. Thus, in some embodiments, controlling the readers 12-17 comprises selecting readers, and if a selected reader is deselected by the controller, another reader is selected by the controller such that there is no reader energy, above a predetermined threshold, at the new selected reader.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

I claim:

1. A method comprising:
   a first RFID reader beginning an inventory session, the RFID reader setting a flag on respective RFID tags that have been inventoried by the first RFID reader;
   storing information representing the tags that have been inventoried by the first RFID reader;
   interrupting the first RFID reader's inventory session;
   resetting the flags on the tags that have been inventoried;
   a second RFID reader beginning an inventory session, the second RFID reader setting a flag on respective RFID tags that have been inventoried;
   storing information representing the tags that have been inventoried;
   resetting the flags set by the second RFID reader; and
   resuming the inventory session of the first RFID reader, the resuming including reflagging the tags for which information was stored representing the tags that were inventoried by the first RFID reader.

2. A method in accordance with claim 1 wherein the storing of information representing the tags that have been inventoried by the first RFID reader comprises storing the information representing the tags that have been inventoried by the first RFID reader in the first RFID reader.

3. A method in accordance with claim 1 wherein setting a flag on respective RFID tags that have been inventoried by the first RFID reader comprises setting a bit on respective RFID tags.

4. A method in accordance with claim 1 wherein setting a flag on respective RFID tags that have been inventoried by the first RFID reader comprises setting a lockout bit on respective RFID tags.

5. A method in accordance with claim 1 wherein setting a flag on respective RFID tags that have been inventoried by the first RFID reader comprises setting a sessions bit on respective RFID tags.

6. A method in accordance with claim 1 wherein storing information representing the tags that have been inventoried by the first RFID reader comprises storing information in a database.

7. A method in accordance with claim 6 wherein storing information representing the tags that have been inventoried by the second RFID reader comprises storing information in a second database.

8. A method in accordance with claim 1 and further comprising interrupting the inventory session of the second RFID reader prior to resetting the flags set by the second RFID reader.

9. A method in accordance with claim 1 and further comprising completing the inventory session of the second RFID reader prior to resetting the flags set by the second RFID reader.

10. A system comprising:
a first RFID reader configured to conduct an inventory session, the first RFID reader being configured to set a flag on respective RFID tags that have been inventoried by the first RFID reader and to store information representing the tags that have been inventoried by the first RFID reader as they are being inventoried, the first RFID reader being capable of being selectively interrupted in its inventory session, the first RFID reader being configured to reset the flags on the tags that have been inventoried in response to being interrupted; and
a second RFID reader configured to conduct an inventory session, the first RFID reader being configured to set a flag on respective RFID tags that have been inventoried by the second RFID reader and to store information representing the tags that have been inventoried by the second RFID reader as they are being inventoried, and being configured to reset the flags set by the second RFID reader when it is time for the first RFID reader to resume its inventory session, wherein the first RFID reader is further configured to reflag the tags for which information was stored representing the tags that were inventoried by the first RFID reader prior to resuming its interrupted inventory session.

11. A system in accordance with claim 10 and further comprising an RFID tag having a bit representing the flag that is used to indicate whether the tag has been inventoried.

12. A system in accordance with claim 10 wherein the information representing the tags that have been inventoried comprises a tag ID number.

13. A system in accordance with claim 10 and further comprising an RFID tag having a lockout bit representing the flag that is used to indicate whether the tag has been inventoried.

14. A system in accordance with claim 10 and further comprising an RFID tag having a sessions bit representing the flag that is used to indicate whether the tag has been inventoried.

15. A system in accordance with claim 10 wherein the first RFID reader comprises a database to store information representing the tags that have been inventoried by the first RFID reader.

16. A system in accordance with claim 15 wherein the second RFID reader comprises a database to store information representing the tags that have been inventoried by the second RFID reader.

17. A system in accordance with claim 10 wherein the second RFID reader is configured to reset the flags set by the second RFID reader in response to the second RFID reader's inventory session being interrupted.

18. A system in accordance with claim 10 wherein the second RFID reader is configured to reset the flags set by the second RFID reader in response to the second RFID reader's inventory session being completed.

* * * * *